(12) United States Patent
Daniels

(10) Patent No.: US 8,701,423 B2
(45) Date of Patent: Apr. 22, 2014

(54) DUAL MODE AUTOMOBILE AIR-CONDITIONING SYSTEM AND METHODS OF USE

(76) Inventor: Jerome Daniels, Elizabeth, CO (US)

( * ) Notice: Subject to any disclaimer, the term of this patent is extended or adjusted under 35 U.S.C. 154(b) by 0 days.

(21) Appl. No.: 13/825,650

(22) PCT Filed: Jan. 23, 2012

(86) PCT No.: PCT/US2012/022179
§ 371 (c)(1),
(2), (4) Date: Mar. 22, 2013

(87) PCT Pub. No.: WO2012/102991
PCT Pub. Date: Aug. 2, 2012

(65) Prior Publication Data
US 2013/0180264 A1 Jul. 18, 2013

Related U.S. Application Data

(60) Provisional application No. 61/436,993, filed on Jan. 27, 2011, provisional application No. 61/490,013, filed on May 25, 2011.

(51) Int. Cl.
*F25D 3/12* (2006.01)
(52) U.S. Cl.
USPC .................. 62/56; 62/235.1; 62/244
(58) Field of Classification Search
CPC . F25B 21/00–21/04; F25B 1/00; F25B 27/00; B60H 1/32
USPC ........ 62/3.2, 56, 323.3, 235.1, 236, 239, 243, 62/244; 417/223, 319; 29/592.1
See application file for complete search history.

(56) References Cited

U.S. PATENT DOCUMENTS

| 6,695,591 | B2 * | 2/2004 | Grimmer et al. | 417/203 |
| 6,796,367 | B2 | 9/2004 | Blacquiere et al. | |
| 2002/0028150 | A1 * | 3/2002 | Kawabata et al. | 418/55.1 |
| 2003/0086797 | A1 * | 5/2003 | Stickland et al. | 417/362 |
| 2003/0215339 | A1 * | 11/2003 | Grimmer et al. | 417/201 |
| 2004/0071567 | A1 * | 4/2004 | Stickland et al. | 417/362 |
| 2004/0149245 | A1 * | 8/2004 | Moriya | 123/179.4 |
| 2008/0196818 | A1 * | 8/2008 | Di Meco et al. | 156/139 |
| 2009/0239693 | A1 * | 9/2009 | Ruffini et al. | 474/112 |

FOREIGN PATENT DOCUMENTS

| JP | 08-142642 A | 6/1996 |
| JP | 2007-069657 A | 3/2007 |
| JP | 2007-320393 A | 12/2007 |

\* cited by examiner

*Primary Examiner* — Mohammad M Ali
(74) *Attorney, Agent, or Firm* — Leyendecker & Lemire, LLC

(57) ABSTRACT

The present inventive disclosure is directed generally to an improved automobile air-conditioning system that can be operated while the automobile's engine is not running. In variations, a typical vapor-compression-cycle air-conditioning system is modified to allow the refrigerant compressor to be driven from either of two power sources: (1) from a traditional engine-mounted pulley system, or (2) from a DC-motor powered by an electrical source independent from the engine. In another variation, the air-conditioning system is driven by one or more thermal-electric-cooling (TEC) modules, wherein the TEC-based system is powered by an auxiliary DC-power source that in some variations is powered by, or at least supplemented by, a solar-energy grid. Additionally, a variation of the modified automobile air-conditioning system includes both the modified-compressor-based system and the TEC-based system, wherein the compressor-based system is used to initially cool-down an automobile passenger compartment, then is shutdown in favor of the TEC-based system.

51 Claims, 11 Drawing Sheets

DUAL MODE AUTOMOBILE AIR-CONDITIONING SYSTEM AND METHODS OF USE

CROSS-REFERENCE TO RELATED APPLICATIONS

This patent application claims the benefit of U.S. Provisional Patent Application No. 61/436,993, filed on Jan. 27, 2001, and U.S. Provisional Patent Application No. 61/436, 993 is hereby incorporated by reference for all purposes. This patent application also claims the benefit of U.S. Provisional Patent Application No. 61/490,013, filed on May 25, 2011, and U.S. Provisional Patent Application No. 61/490,013 is also hereby incorporated by reference for all purposes.

BACKGROUND

Most current air-conditioning systems for automobiles employ traditional refrigerant-compression system, wherein the refrigerant compressor is driven by a system of pulleys that transmit rotational energy directly from a running automobile engine. Such air-conditioning systems are inoperable until a user actually starts the internal-combustion engine of the vehicle, after which the user can engage the air-conditioning system controls to cool the passenger compartment.

What is not possible with current systems is the ability to remotely start a vehicle's air-conditioning system without also running the engine. What would be useful and convenient for users is an automobile air-conditioning system that can be driven by a fully electrical power source, preferably renewable, when the engine of the vehicle is not running. Moreover, it would be desirable for such a system to be able to be communicatively coupled and controlled by a user using a wireless device such as a cellular phone application or a keyless radio-frequency controller.

DETAILED DESCRIPTION

I. Overview

Figure 1A:
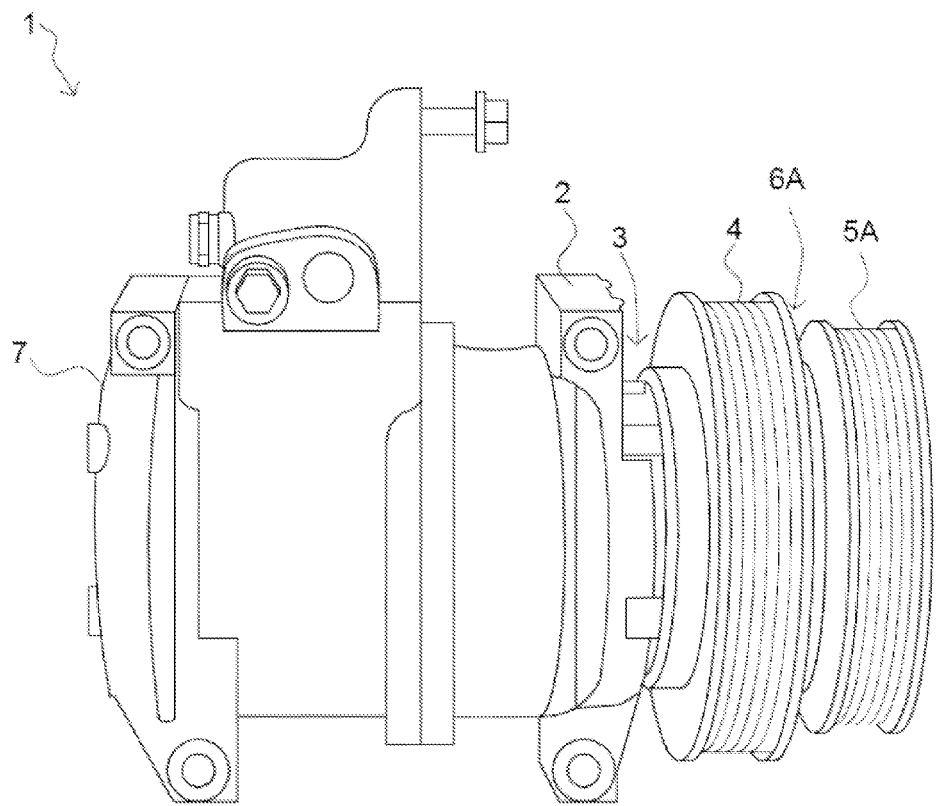
FIG. 1A depicts an embodiment of an automobile air-conditioning system refrigerant compressor that is adapted to be driven either by the vehicle engine via a pulley selectively engaged to the compressor shaft by a first electric clutch or by a second power source via a second compressor-shaft-mounted pulley. In this embodiment, both pulleys are mounted on the same end outside of the compressor end bell/front housing.
Figure 1B:
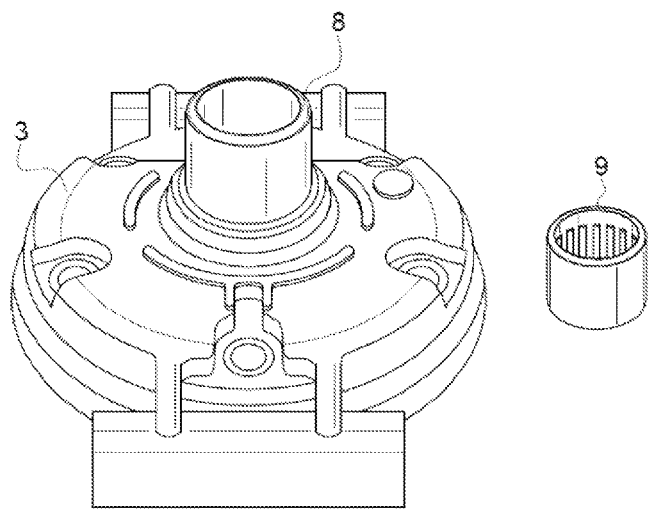
FIG. 1B depicts an embodiment of a the compressor end bell/front housing for the compressor depicted in FIG. 1A, including the "neck" through which the compressor shaft is mounted and a "needle bearing" used to support the compressor shaft, which is used to support each pulley.
Figure 1C:
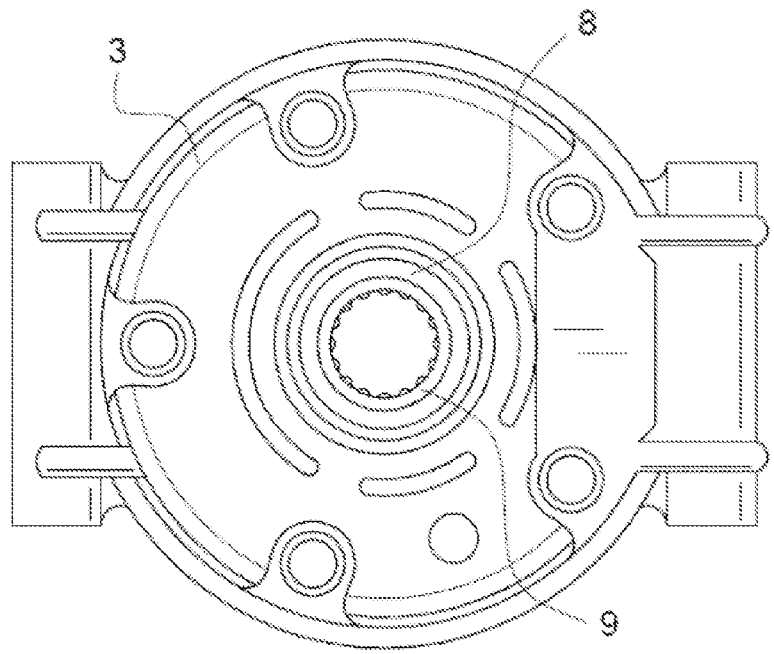
FIG. 1C depicts a front view of an embodiment of a compressor end bell/front housing for the compressor depicted in FIG. 1B, with "needle bearing" installed in the "neck".
Figure 1D:
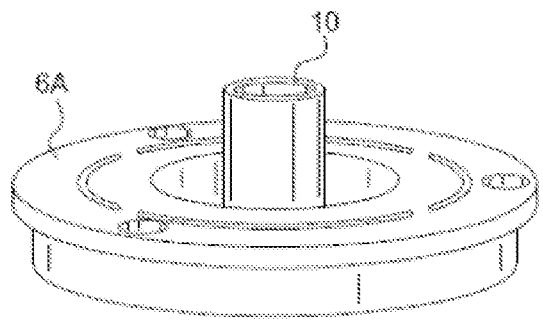
FIG. 1D depicts one embodiment of an outer hub used to mount the second (outer) pulley shown in FIG. 1A.
Figure 1E:
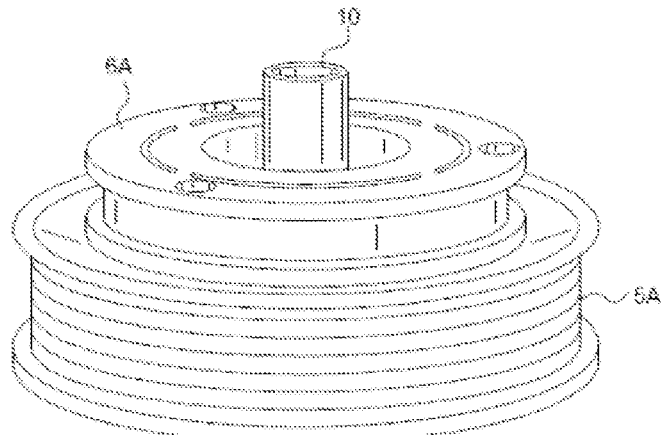
FIG. 1E depicts one embodiment of an outer hub of FIG. 1D with the second (outer) pulley shown installed on it.
Figure 2:
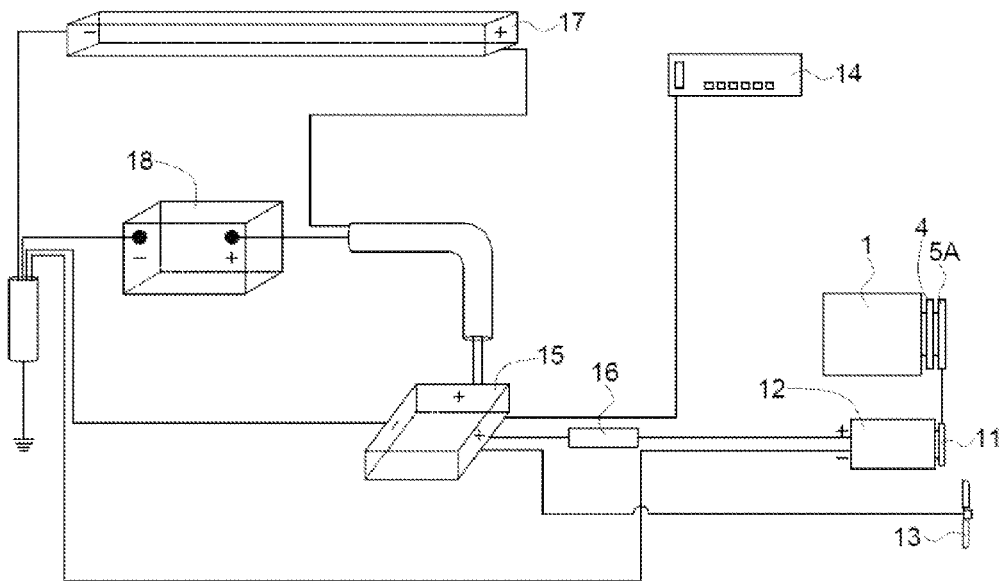
FIG. 2 depicts one embodiment of a system diagram for a dual-power-mode automobile air-conditioning system using a modified compressor.
Figure 3:
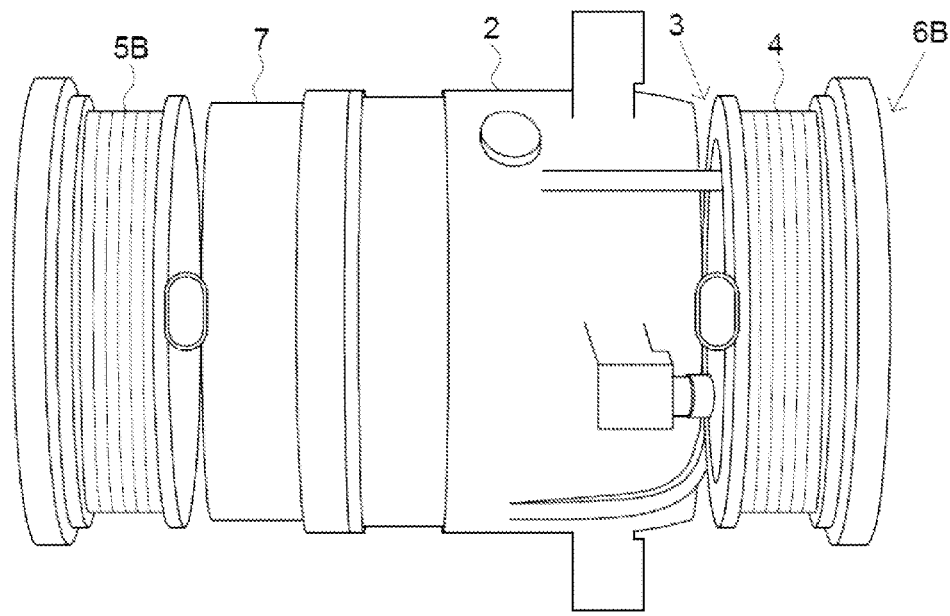
FIG. 3 depicts an embodiment of an automobile air-conditioning system refrigerant compressor that is adapted to be driven either by the vehicle engine via a pulley selectively engaged to the compressor shaft by a first electric clutch or by a second power source via a second compressor-shaft-mounted pulley. In this embodiment, each pulley is mounted on the opposite end outside of the respective compressor end bell/housing, with respect to the other pulley.
Figure 4:
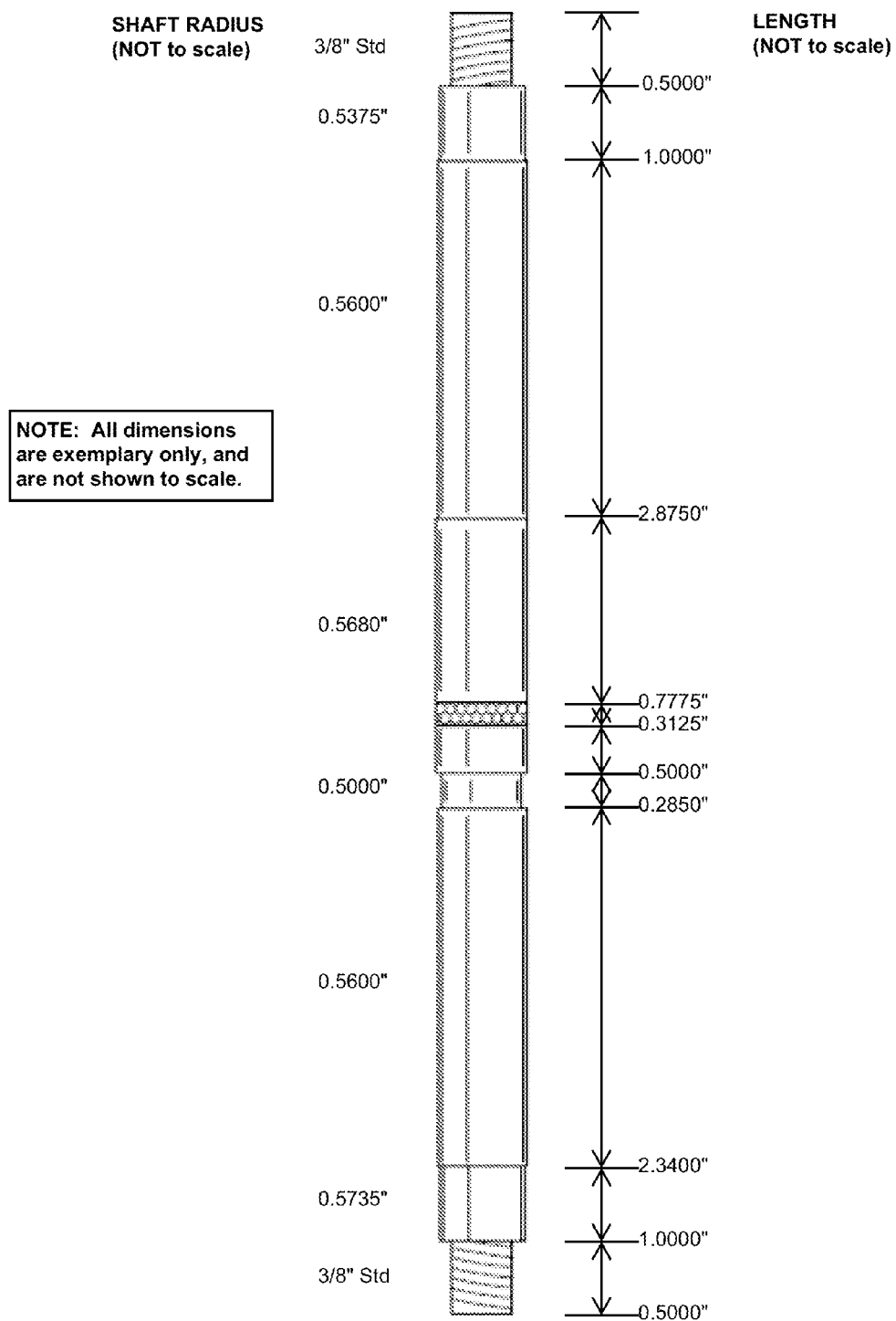
FIG. 4 depicts one embodiment of a modified compressor shaft used to mount two pulleys on opposite ends, with respect to each other, as shown in the compressor in FIG. 3. The drawing in this figure is not to scale and the dimensions shown are exemplary only.
Figure 5:
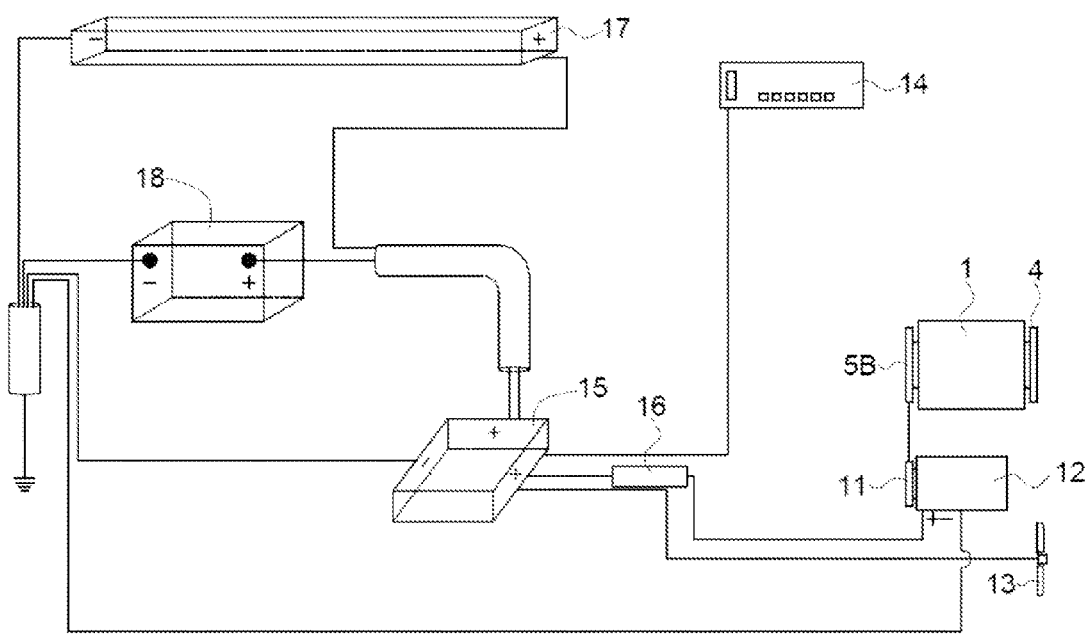
FIG. 5 depicts an alternate embodiment of a system diagram for a dual-power-mode automobile air-conditioning system modified compressor, as opposed to the embodiment depicted in FIG. 2.

The present inventive disclosure is directed generally to an improved automobile air-conditioning system that can be operated while the automobile's engine is not running. In one embodiment, a typical vapor-compression-cycle air-conditioning system is modified to allow the refrigerant compressor to be driven from either of two power sources: (1) from a traditional engine-mounted pulley system, or (2) from a DC motor powered by an electrical source independent from the engine, wherein the DC motor drives a secondary pulley mounted on the refrigerant compressor. In a different embodiment, the air-conditioning system is driven by one or more thermal-electric-cooling (TEC) modules that employ the Peltier Effect, wherein the TEC-based system is powered by an auxiliary DC power source that in some variations is powered by, or at least supplemented by, a solar-energy grid. In yet another embodiment, a modified automobile air-conditioning system comprises both the modified-compressor-based system and the TEC-based system, wherein the compressor-based system is used to initially cool-down an automobile passenger compartment, then is shutdown in favor of the TEC-based system to maintain the attained ambient temperature.

In an embodiment, the refrigerant compressor has a standard primary pulley that is configured to be driven by an automobile engine, said primary pulley engaged by way of an electric clutch commonly found in virtually all automobile air-condition systems. However, the compressor is also equipped with a secondary pulley that is directly coupled to the compressor shaft. This secondary pulley driven by a DC-powered motor via a third pulley and belt assembly, the third pulley coupled to the shaft of the DC motor via a second electric clutch assembly, and the DC-powered motor has a power source independent of the engine. Typically, this independent power source is a combination of an auxiliary battery and a solar-cell grid. In variations, there is a control-system interlock to prevent simultaneous engagement of both clutch-pulley assemblies so that the compressor is only powered from one source at a time. In other variations, the compressor has a modified shaft adapted to have the primary and secondary clutch-pulley assemblies mounted on opposite ends of the compressor. In still more variations, the modified shaft of the compressor is adapted to have the primary and secondary pulley assemblies on the same end of the compressor housing.

The air-conditioning system is configured to allow the refrigerant compressor, and/or the TEC-based modules, depending on the embodiment, to drive the air-conditioning system processes even though the engine is turned off, with the goal to allow for pre-cooling of a passenger compartment before actual engine operations are conducted. In an embodiment, the air-conditioning system is remotely activated while the engine is off, and is powered by an auxiliary battery, augmented by a solar-power grid that also serves to help keep the auxiliary battery charged. In this mode, in an embodiment, the air-conditioning system can run for 15-30 minutes to pre-cool the automobile's passenger compartment before having to turn on the engine to activate the primary air-conditioning power source.

In additional embodiments, the remote activation employs keyless technologies known in the art. In other variations, users can remotely activate the DC-powered mode of the air-conditioning system via a smart-phone application where the target automobile is enabled to receive mobile communications.

II. Terminology

The terms and phrases as indicated in quotes (" ") in this section are intended to have the meaning ascribed to them in this Terminology section applied to them throughout this document, including the claims, unless clearly indicated otherwise in context. Further, as applicable, the stated definitions are to apply, regardless of the word or phrase's case, to the singular and plural variations of the defined word or phrase.

The term "or", as used in this specification and the appended claims, is not meant to be exclusive; rather, the term is inclusive, meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of the phrase "in one embodiment" and/or "in one variation" in various places in the specification are not necessarily all meant to refer to the same embodiment.

The term "couple" or "coupled", as used in this specification and the appended claims, refers to either an indirect or a direct connection between the identified elements, components, or objects. Often, the manner of the coupling will be related specifically to the manner in which the two coupled elements interact.

The term "removable", "removably coupled", "readily removable", "readily detachable", "detachably coupled", and similar terms, as used in this patent application specification (including the claims and drawings), refer to structures that can be uncoupled from an adjoining structure with relative ease (i.e., non-destructively, and without a complicated or time-consuming process) and that can also be readily reattached or coupled to the previously adjoining structure.

Directional and/or relational terms such as, but not limited to, left, right, nadir, apex, top, bottom, vertical, horizontal, back, front, and lateral are relative to each other, are dependent on the specific orientation of an applicable element or article, are used accordingly to aid in the description of the various embodiments in this specification and the appended claims, and are not necessarily intended to be construed as limiting.

As applicable, the terms "about" or "generally", as used herein in the specification and appended claims, and unless otherwise indicated, means a margin of ±20%. Also, as applicable, the term "substantially" as used herein in the specification and appended claims, unless otherwise indicated, means a margin of ±10%. It is to be appreciated that not all uses of the above terms are quantifiable such that the referenced ranges can be applied.

III. A Dual-Power-Source Compressor-Based Automobile Air-Conditioning System

This embodiment is directed generally to a vapor-compressor-based air-conditioning system for an automobile, featuring a specially modified air-conditioning compressor adapted to be driven from either of two different power sources.

Refer to FIGS. 1A-6. In an embodiment, the air-conditioning system comprises a specially modified vapor compressor 1, which in variations can take one of two main forms, as discussed below. In some embodiments, the refrigerant compressor 1, has a first housing end bell 2, a second housing end bell 7, an inlet and an outlet for transporting refrigerant, and a central drive shaft 19 that when turned with rotational force causes the compressor 1 to compress refrigerant gasses contained therein. Further, the system has a first compressor-driving pulley 4 adapted to facilitate the rotational driving of the compressor 1 via the use of a pulley belt driven by an automobile engine. In one variation, the compressor 1 is engaged to the first compressor-driving pulley 4 by a first electric clutch assembly 3 adapted to facilitate the selective coupling of the first pulley 4 with the central drive shaft 19, when the electric clutch assembly 3 is energized. In another variation, the system has a second compressor-driving pulley 5A, 5B directly coupled to said central drive shaft to facilitate the rotational driving of the compressor 1 via a pulley belt driven by a power source that does not rely on the running of an automobile engine.

In another embodiment, to facilitate the driving of the compressor 1 from a secondary power source, the system has an electrical motor 12 adapted to be able to drive the refrigerant compressor 1 via a pulley system 11, wherein said electrical motor is adapted to be powered from an independent DC power source that does not depend on the running of the engine of said automobile. In variations, the shaft of the electrical motor 12 is adapted to drive a third pulley 11 mounted at one end of the housing of the electrical motor 12, the third pulley 11 coupled to the second compressor-driving pulley 5A, 5B via a pulley belt, and the electrical motor 12 is adapted to have a second electric clutch assembly 6A, 10 to allow the selective coupling of the electrical motor's 12 shaft and the third pulley 11, depending on whether the electric clutch assembly is energized. The electric clutches 3, 6A used are of the type currently well-known in the art in automobile air-conditioning systems.

In still more embodiments, the system has an evaporator for transferring heat from the passenger compartment air of the automobile to the refrigerant circulated within the evaporator, as is the case with a typical compressor-based automobile air-conditioning system. Similarly, the system has at least one electric passenger-compartment cooling fan 13 for circulating air around the evaporator, a condenser for transferring heat from refrigerant to the outside atmosphere, and at least one electric heat-sink fan 13 for circulating outside air around the condenser 1.

In yet more embodiments, the system includes an independent DC electrical system; that is, independent of the automobile's engine electrical system; comprised of:

- at least one battery 18 (typically rated at approximately 12 VDC or 24 VDC) for providing power to the air-conditioning system when the automobile engine is shutdown;
- a solar-energy grid 17 adapted to be mounted at one or more surfaces and/or windows of the automobile to ensure solar exposure for producing electrical power, and adapted to provide a trickle charge to the at least one battery 18; and
- a programmable controller module 14, 15, 600 adapted to monitor the voltage level of the at least one battery 18, the passenger-compartment ambient temperature, and the operating status of the automobile, wherein:
    - The programmable controller module 14, 15, 600 is further adapted to start the air-conditioning system and set the power mode for the air-conditioning system, and
    - The programmable controller module 14, 15, 600 is adapted to prevent the simultaneous engagement of the first and second electric clutches 3, 6A.

The ratings/sizes of the various components of the DC motor 12 and independent DC electrical system (e.g., battery 18, solar-energy grid 17) can vary with the application. The available surface area for the installation of solar-energy grid panels 17, for example, will affect the necessary efficiency and power ratings of the solar-energy grid panels 17 used, and thus the number of solar-energy grid panels 17 used. In some embodiments, the solar-energy grid 17 may only have enough capacity to supplement the battery 18 when powering the air-conditioning system, and otherwise recharge the battery 18 when not powering the air-conditioning system. In one example embodiment, the solar-energy grid 17 is wafer-thin (<¼ inch thick), is capable of producing power in even cloudy conditions, is rated for at least 4500-7500 Watts, and is sized such that it is capable of charging the battery 18 at approximately 1% of the battery's 18 rated capacity. In the case of the battery 18 and DC motor 12, in one embodiment, the DC motor rating (which will determine the selected battery size) is 12-24 VDC, 2.5-3.5 HP, 2500-3500 rpm, and weighs approximately 10 lbs or less.

In some variations, the first compressor-driving pulley 4 is adapted to receive a pulley belt of a type selected from the group including serpentine, V-belt, V-link, and/or flat. Similarly, in other variations, the second compressor-driving pulley 5A, 5B is adapted to receive a pulley belt of a type selected from the group including serpentine, V-belt, V-link, and/or flat.

In one version of the system's modified compressor 1, the first and second compressor-driving pulleys 4, 5A are mounted on the same side of the central drive shaft 19, the electric clutch assembly 3, 6A is equipped with an outer hub 10 at which the first compressor-driving pulley 4 is adapted to be selectively coupled to the central drive shaft 19, and the second compressor-driving pulley 5B is directly coupled to the central drive shaft via the neck 8 of the outer hub, onto which is installed an additional roller bearing 9.

In an another version of the system's modified compressor 1, the first and second compressor-driving pulleys 4, 5B on opposite sides of said central drive shaft 19 with respect to each other, the central drive shaft 19 is modified to extend beyond the compressor housing end bell 7 in order to support one of the first and second pulleys 4, 5B at each end of the compressor 1. In similar variations, each of the first and second housing end bells 2, 7 are substantially structurally identical, and each has a bearing adapted to support the central drive shaft 19, with each end having packing seals for inhibiting the leakage of either lubricants or refrigerant. In yet another variation on this, at one end of the compressor 1, the electric clutch assembly 3 is equipped with an outer hub 6B at which the first compressor-driving pulley 4 is adapted to be selectively coupled to the central drive shaft 19; and at the other end of the compressor 1, the second compressor-driving pulley 5B is directly coupled to the compressor's drive shaft 19 via the neck of respective housing end bell 7, onto which is installed an additional roller bearing 9.

In many embodiments, the power mode set by the programmable controller module 14, 15, 600 is selected from the group including the following options: powered by the engine, powered by the independent DC electrical system using the battery 18, and/or recharging mode of said battery from the solar-energy grid 17.

In more embodiments, the programmable controller module 14, 15, 600 comprises a computer-readable medium containing programmed instructions that cause the independent DC electrical system to energize the second electric clutch 6A, the electrical motor 12, the at least one passenger-compartment fan 13, and the at least one heat-sink fan 13 to energize and activate the air-conditioning system at a pre-determined day and time, for a pre-determined interval, while the automobile engine is not running.

In yet another variation, the programmable controller module 14, 15, 600 comprises a computer-readable medium containing programmed instructions that cause the powering of the air-conditioning system to emanate from the independent DC electrical system while disengaging the first electric clutch 4 when the automobile slows to a predetermined speed or less (for example, 10 mph or less).

In still other variations, the programmable controller module 14, 15, 600 comprises a computer-readable medium containing programmed instructions that cause the powering of the air-conditioning system to emanate from the independent DC electrical system while disengaging the first electric clutch 4 when the automobile is at a standstill while the automobile engine is running and the automobile's transmission is in a park or neutral state.

In more embodiments, the programmable controller module 14, 15, 600 is adapted for wireless communication in order to enable remote-control operations by a user such that the air-conditioning system can be remotely started and stopped by a user using a remote keyless device and/or a mobile application on a wireless communications device.

In an exemplary embodiment, power-management by the programmable controller module 600 (see FIG. 6) follows the following steps:

Determine the primary energy source state; e.g., is the automobile running, and what is the state of charge of the battery 18? 605

Determine whether to run a preprogrammed (user-defined) mode or an automatic mode. 610
If in preprogrammed mode, then:
  Activate at the programmed time. 615
  Run the system for the programmed time. 620
  Set the fan speed; automobile climate. 625
  Set the climate-control unit temperature. 630
If in automatic mode, then:
  Engage the alternative DC electrical power system in lieu of the engine when the car is ≤10 mph, has been idle or stopped for ≥2 minutes, OR the engine is running and the vehicle transmission is in Park (P) or Neutral (N). 635
Determine whether the primary energy source (e.g., battery 18) is below an allowable/predetermined threshold. 640
If NO, then:
  Open the circuit between the solar-energy grid 17 and the primary energy source time. 645
  Close the circuit between the primary energy source 18 and the DC motor 12. 650
  Open the circuit between the solar-energy grid 17 and the DC motor 12. 655
  END. 685
If YES, then:
  Close the circuit between the solar-energy grid 17 and the DC motor 12. 660
  Open the circuit between the primary energy source 18 and the DC motor 12. 665
  Close the circuit between the solar-energy grid 17 and the primary energy source 18. 670
  Recharge the primary energy source 18. 675
  Determine whether primary energy source 18 is back above threshold. 680
  If NO, then repeat these recharge steps.
  If YES, then END. 685

IV. A Dual-Power-Source
Thermal-Electric-Cooler-Based Automobile
Air-Conditioning System This embodiment is directed generally to a thermal-electric-cooler (TEC) based air-conditioning system for an automobile, featuring the use of devices that employ the Peltier Effect as current passes through a junction of dissimilar materials, and which is adapted to be powered from either of two different power sources.

Figure 7:
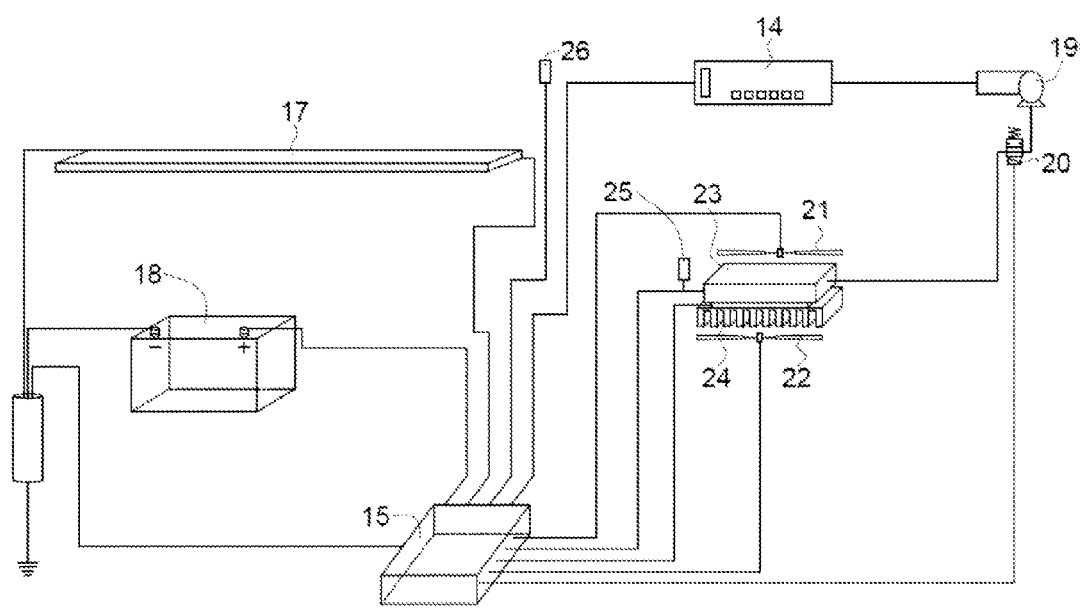
FIG. 7 depicts one embodiment of a system diagram of an air-conditioning system that employs at least one thermal-electric cooler (TEC) module instead of a vapor-compression system.
Figure 8A:
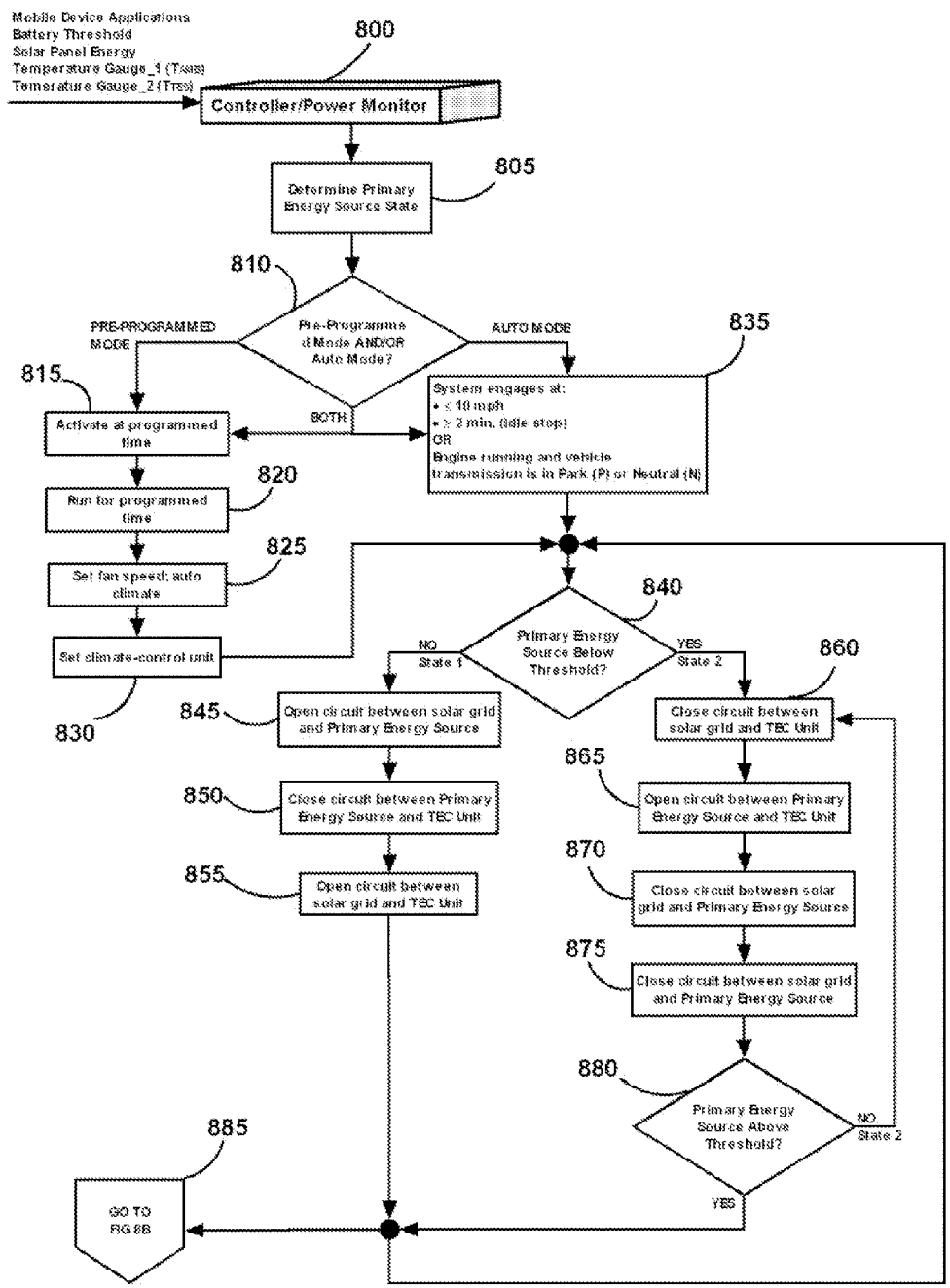
FIG. 8A depicts one embodiment of a process flow diagram for a TEC-based automobile air-conditioning system, and specifically addresses the system's management of the energy sources for the DC power supplied to the TEC module(s).
Figure 8B:
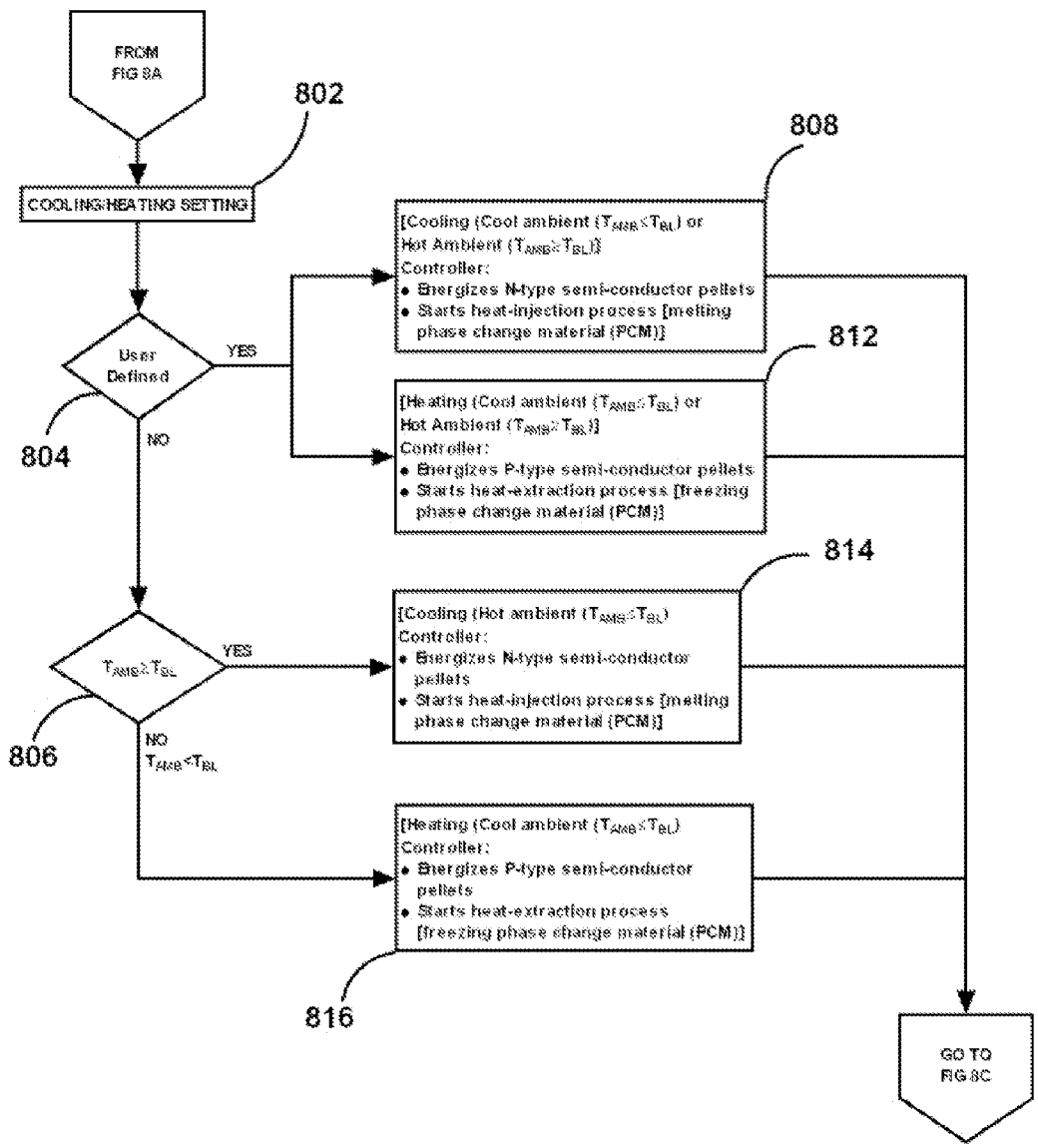
FIG. 8B depicts one embodiment of a process flow diagram for a user or system setting of a target operating ambient temperature.
Figure 8C:
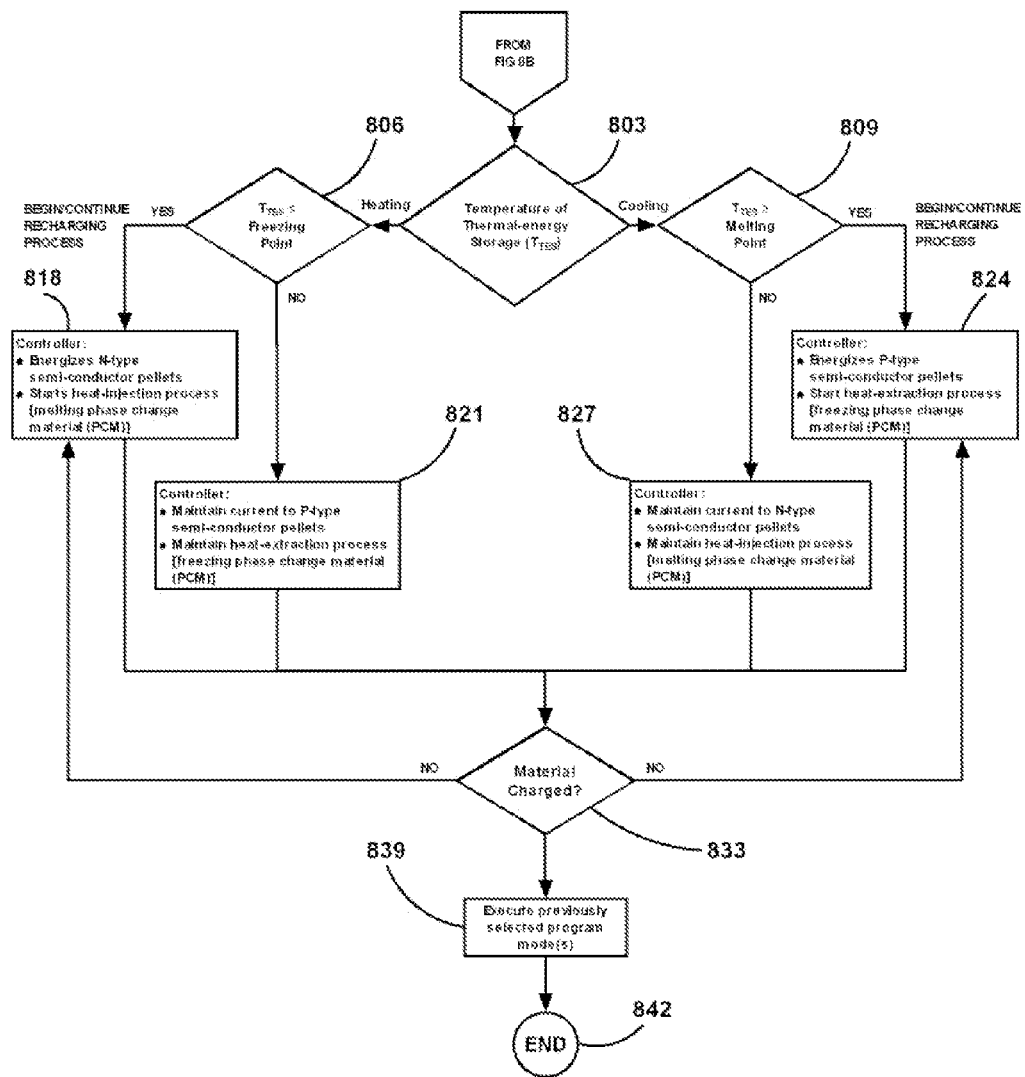
FIG. 8C depicts one embodiment of the process an embodiment of the TEC-based air-conditioning system goes through to store thermal energy for cooling and heating purposes.
Figure 9:
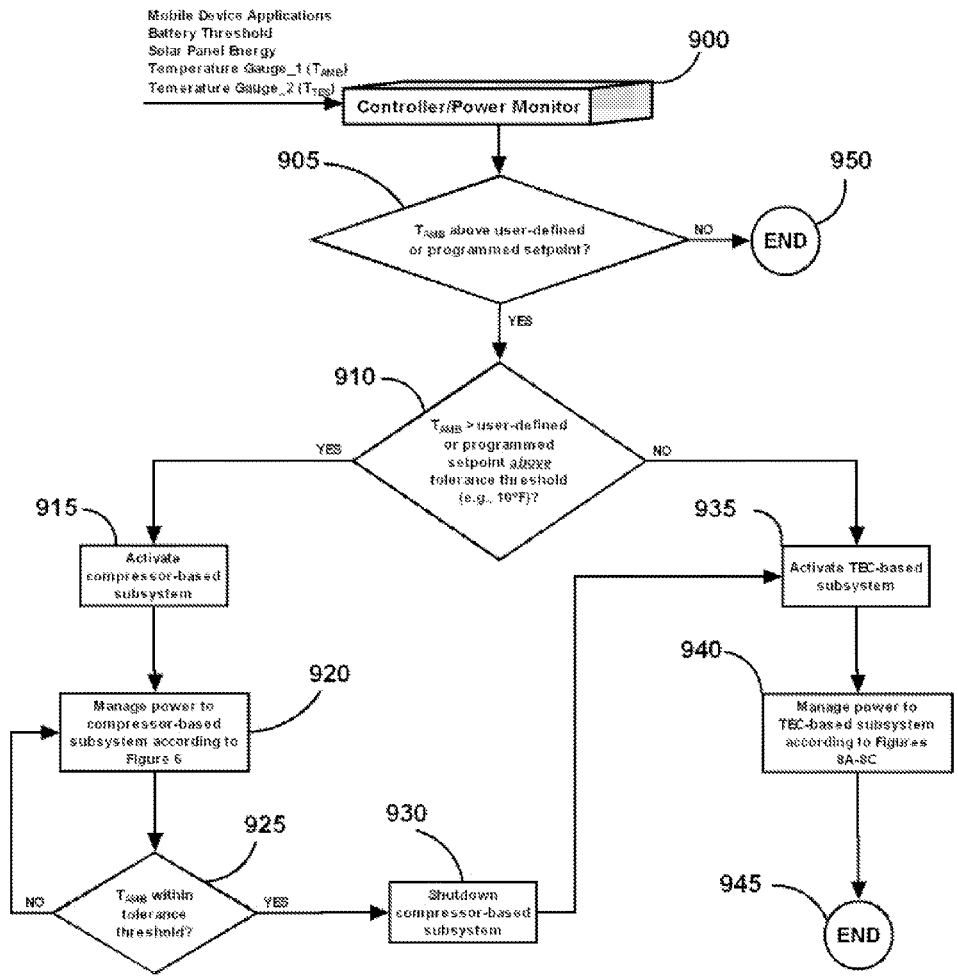
FIG. 9 depicts one embodiment of a control-system process used to manage the operation of an automobile air-conditioning system that employs both a modified-compressor-based system and a TEC-based system.

Refer to FIGS. 7-8C. In an embodiment, the air-conditioning system comprises a thermal-electric cooler (TEC) module 24, having one or more Peltier junctions, and a thermal-energy-storage (TES) unit 23 comprised of at least one low-pressure container containing a non-reactive filler material, wherein the non-reactive filler material is adapted to absorb heat and melt above a predetermined threshold, and conversely is adapted to release stored heat and freeze at a predetermined threshold. In addition, in variations, the system has one or more forced-air-circulation devices 19, 21, 22 for circulating ambient air between the passenger compartment of an automobile, and the TEC module 24 and TES unit 23.

In summary, this TEC-based system uses sensible heat to store energy in and extract energy from the TES 23. The non-reactive filler material in the TES 23 is arranged such that the maximum heat transfer is achieved with minimal pressure drop between the TES 23 air-inlet pressure and the outlet pressure. The transition temperature for the filler material in the TES 23 is controlled so that it melts and freezes at an established baseline temperature ($T_{BL}$), typically about 21.1° C. (70° F.). In an embodiment, the ambient temperature ($T_{AMB}$) detector communicates its readings to a programmable controller module 14, 15, 800. For heating, the ambient temperature is compared to the baseline temperature ($T_{BL}$). The temperature of the filler material (measured by detector 25) is compared to 0° C. (32° F.) ($T_{STAT}$). If $T_{AMB} < T_{BL}$, and the TES filler-material temperature is <0° C. (32° F.), then the TES filler material will begin to freeze as it gives off heat. Conversely, for cooling, the ambient temperature is also compared to the baseline temperature ($T_{BL}$). Similarly, the temperature of the filler material (measured by detector 25) is compared to 0° C. (32° F.) ($T_{STAT}$). If $T_{AMB} \geq T_{BL}$, then the TES filler material will begin to melt as it absorbs heat. These temperatures are continuously monitored for purposes of "recharging" the TES filler material in order to facilitate later cooling/heating.

In yet more embodiments, the system includes an independent DC electrical system; that is, independent of the automobile's engine electrical system; comprised of:
  at least one battery 18 (typically rated at approximately 12 VDC or 24 VDC) for providing power to the air-conditioning system when the automobile engine is shut-down;
  a solar-energy grid 17 adapted to be mounted at one or more surfaces and/or windows of the automobile to ensure solar exposure for producing electrical power, and adapted to provide a trickle charge to the at least one battery 18; and
  a programmable controller module 14, 15, 800 adapted to monitor the voltage level of the at least one battery 18, the passenger-compartment ambient temperature 26, and the operating status of the automobile, wherein:
    The programmable controller module 14, 15, 800 is further adapted to start the air-conditioning system and set the power mode for the air-conditioning system. Typically, the system manipulations include the opening or closing of one or more solenoid valves 20. In a variation, the solenoid valve 20 is a two-port, two-position solenoid valve.

In a variation, the non-reactive filler material in the TES 23 may be selected from the group including Silicon Nitride, Silicon Carbide, Titanium Diboride, Aluminum Oxide, and/or Mullite.

In many embodiments, the power mode set by the programmable controller module 14, 15, 800 is selected from the group including the following options: powered by the engine, powered by the independent DC electrical system using the battery 18, and/or recharging mode of said battery from the solar-energy grid 17.

In another variation, the programmable controller module 14, 15, 800 comprises a computer-readable medium containing programmed instructions that cause the independent DC electrical system to energize the one or more passenger-compartment forced-air circulation devices 19, 21, 22 and activate the air-conditioning system at a pre-determined day and time, for a pre-determined interval, while said automobile engine is not running.

In yet another variation, the programmable controller module 14, 15, 800 comprises a computer-readable medium containing programmed instructions that cause the powering of the air-conditioning system to emanate from the independent DC electrical system instead of said automobile's engine electrical system when said automobile slows to a predetermined speed or less (for example, 10 mph or less).

In still other variations, the programmable controller module 14, 15, 800 comprises a computer-readable medium containing programmed instructions that cause the powering of the air-conditioning system to emanate from the independent DC electrical system instead of the automobile's engine electrical system when the automobile is at a standstill while the automobile engine is running and the automobile's transmission is in a park or neutral state.

In more embodiments, the programmable controller module 14, 15, 800 is adapted for wireless communication in order to enable remote-control operations by a user such that the air-conditioning system can be remotely started and stopped by a user using a remote keyless device and/or a mobile application on a wireless communications device.

In an exemplary embodiment, power-management by the programmable controller module 800 (see FIGS. 8A-8C) follows the following steps:

Determine the primary energy source state; e.g., is the automobile running, and what is the state of charge of the battery 18? 805

Determine whether to run a preprogrammed (user-defined) mode or an automatic mode. 810

If in preprogrammed mode, then:
  Activate at the programmed time. 815
  Run the system for the programmed time. 820
  Set the fan speed; automobile climate. 825
  Set the climate-control unit temperature. 830

If in automatic mode, then:
  Engage the alternative DC electrical power system in lieu of the engine when the car is ≤10 mph, has been idle or stopped for ≥2 minutes, OR the engine is running and the vehicle transmission is in Park (P) or Neutral (N). 835

Determine whether the primary energy source (e.g., battery 18) is below an allowable/predetermined threshold. 840

If NO, then:
  Open the circuit between the solar-energy grid 17 and the primary energy source. 845
  Close the circuit between the primary energy source 18 and the TEC unit 24. 850
  Open the circuit between the solar-energy grid 17 and the TEC unit 24. 855
  END. 885

If YES, then:
  Close the circuit between the solar-energy grid 17 and the TEC unit 24. 860
  Open the circuit between the primary energy source 18 and the TEC unit 24. 865
  Close the circuit between the solar-energy grid 17 and the primary energy source 18. 870
  Recharge the primary energy source 18. 875
  Determine whether primary energy source 18 is back above threshold. 880
  If NO, then repeat these recharge steps.
  If YES, then CONTINUE. 885

Start cooling/heating system setting. 802
User-defined setting?
If YES, then:
  For cooling (cool ambient, $T_{AMB} \leq T_{BL}$; or hot ambient, $T_{AMB} \geq T_{BL}$), the controller 14, 15, 800 energizes N-type semi-conductor pellets; starts heat-injection process [melting the phase-change materials (PCM)]. 808
  For heating (cool ambient, $T_{AMB} \leq T_{BL}$; or hot ambient, $T_{AMB} \geq T_{BL}$), the controller 14, 15, 800 energizes P-type semi-conductor pellets; starts heat-extraction process [freezing the phase-change materials (PCM)]. 812
If NO, then determine if $T_{AMB} \geq T_{BL}$. 806
  If YES, then for cooling (hot ambient, $T_{AMB} \geq T_{BL}$), the controller 14, 15, 800 energizes N-type semi-conductor pellets; starts heat-injection process [melting the phase-change materials (PCM)]. 814
  If NO, then for heating (cool ambient, $T_{AMB} \geq T_{BL}$), the controller 14, 15, 800 energizes P-type semi-conductor pellets; starts heat-extraction process [freezing the phase-change materials (PCM)]. 816

Determine temperature of TES ($T_{TES}$). 803
If heating mode, then:
  If $T_{TES} \leq$ Freezing Point 806, then:
    Energize N-type semi-conductor pellets; 818 and
    Start heat-injection process [melting the phase-change materials (PCM)]. 818
  If $T_{TES} >$ Freezing Point, then:
    Maintain current to P-type semi-conductor pellets; 821 and
    Maintain heat-extraction process [freezing the phase-change materials (PCM)]. 821

If cooling mode, then:
  If $T_{TES} \geq$ Melting Point 809, then:
    Energize P-type semi-conductor pellets; 824 and
    Start heat-extraction process [freezing the phase-change materials (PCM)]. 824
  If $T_{TES} >$ Freezing Point, then:
    Maintain current to N-type semi-conductor pellets; 827 and
    Maintain heat-injection process [freezing the phase-change materials (PCM)]. 827

Determine if PCM fully recharged. 833
If NO, then go to 818 (for heating mode) or 824 (for cooling mode).
Resume execution of previously selected program mode(s). 839
END. 842

V. A Dual-Power-Source, Dual-Mode Automobile Air-Conditioning System

This embodiment is directed generally to an air-conditioning system for an automobile that can be powered from multiple power sources and can operate via either of two operating modes: One operating mode is a vapor-compression-based air-conditioning system, and the other operating mode is a thermal-electric-cooling (TEC) based air-conditioning system. The general goal of this system is to allow a user to cool an automobile's passenger compartment with the engine turned off by first running the compressor-based system via a DC motor long enough to obtain a desired predetermined passenger compartment temperature, then there after switching the operating mode to the TEC-based system to maintain the temperature within a predetermined range. This is because some TEC designs are not ideal for providing for quick and efficient cool-down over a large range, but are more suited for helping to maintain a target temperature once the system has been "primed" with an initially cooled-down environment.

Refer to FIGS. 1A-10. This embodiment basically incorporates both the disclosures in Section III and Section IV, discussed supra. The key addition is a modified programmable controller that not only performs the processes defined in FIGS. 6 and 8A-8C, as well as Sections III and IV, but also controls the operating mode of the overall air-conditioning system; that is, switches between the compressor-based subsystem and the TEC-based subsystem. In addition, in some embodiments, a user can manually select the operating mode of the air-conditioning system.

In an exemplary embodiment, the operating-mode-management by the programmable controller module 900 (see FIG. 9) follows the following steps:

Determine the passenger compartment ambient temperature ($T_{AMB}$) 905

Determine whether $T_{AMB}$ is above user-defined or preprogrammed setpoint. 905

If NO, then stop. 950

If YES, then determine if $T_{AMB}$>user-defined or preprogrammed setpoint above the tolerance threshold (e.g., 10° F. or other user-defined or programmed tolerance range). 910

YES, then: 910

Activate the compressor-based subsystem. 915

Figure 6:
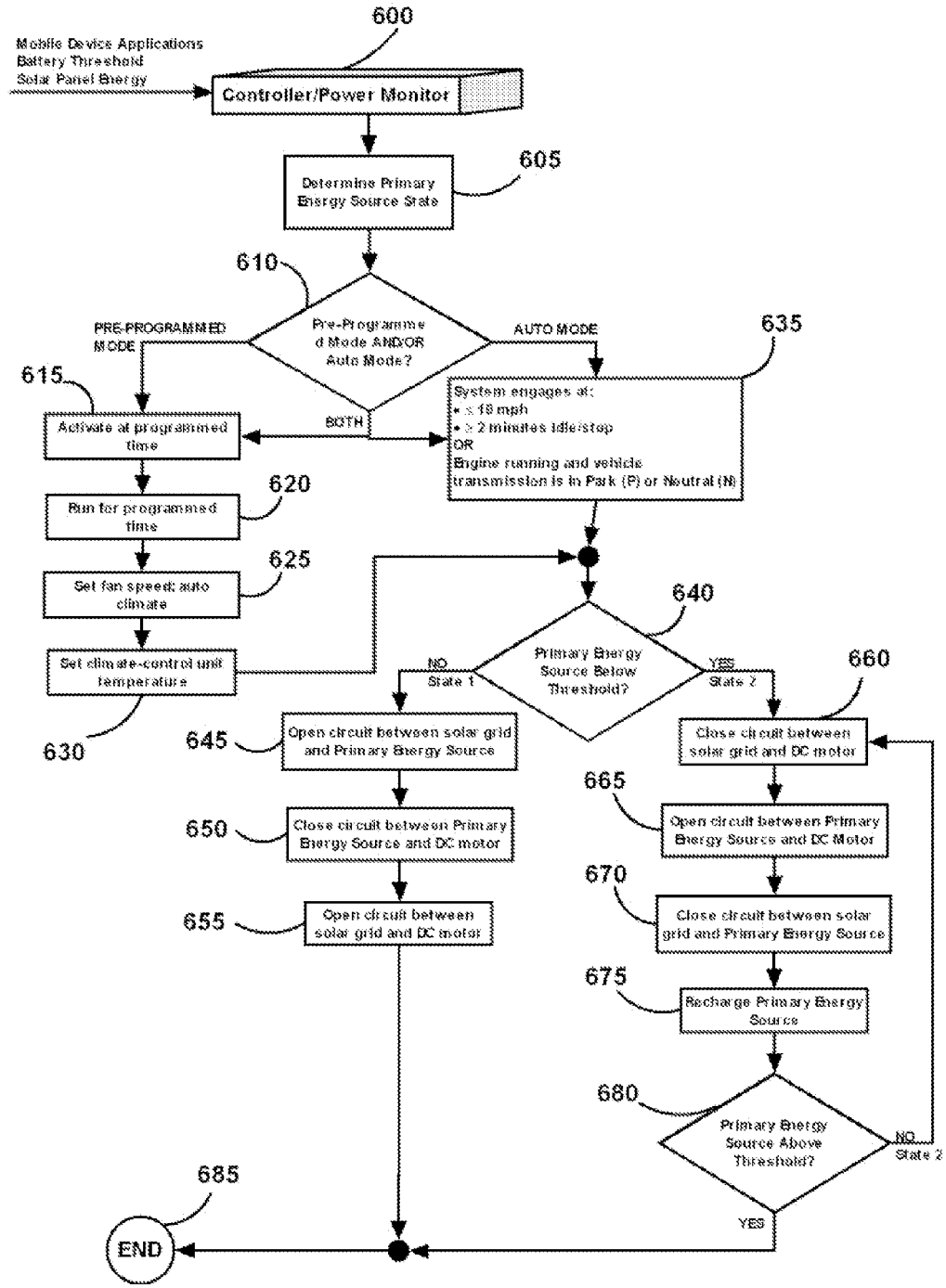
FIG. 6 depicts one embodiment of a process flow diagram for a compressor-based automobile air-conditioning system, and specifically addresses the system's management of the energy sources for the DC power supplied to the DC motor when it drives the compressor.

Manage power to the compressor-based subsystem according to Section III and FIG. 6. 920

If $T_{AMB}$ cools to within the tolerance threshold, then: 925

Shutdown the compressor-based system 930, and

Activate TEC-based subsystem. 935

If NO, then: 910

Activate the TEC-based subsystem. 935

Manage power to the TEC-based subsystem according to Section IV and FIGS. 8A-8C. 940

END. 945

In more embodiments, the programmable controller module 14, 15, 900 is adapted for wireless communication in order to enable remote-control operations by a user such that the air-conditioning system can be remotely started and stopped, and employs the process outlined above by a user using a remote keyless device and/or a mobile application on a wireless communications device.

VI. Alternative Embodiments and Other Variations

The various embodiments and variations thereof described herein and/or illustrated in the accompanying Figures are merely exemplary and are not meant to limit the scope of the inventive disclosure. It should be appreciated that numerous variations of the invention have been contemplated as would be obvious to one of ordinary skill in the art with the benefit of this disclosure.

Hence, those ordinarily skilled in the art will have no difficulty devising myriad obvious variations and improvements to the invention, all of which are intended to be encompassed within the scope of the claims which follow.

What is claimed is:

1. A modified air-conditioning compressor used for a motorized vehicle, said modified compressor comprising:

a refrigerant compressor, said refrigerant compressor having a first housing end bell, said refrigerant compressor having a second housing end bell, said refrigerant compressor having an inlet and an outlet for transporting refrigerant, and said refrigerant compressor having a central drive shaft that when turned with rotational force causes said compressor to compress refrigerant gasses contained therein;

a first compressor-driving pulley adapted to facilitate the rotational driving of said compressor from a first power source via the use of a pulley belt;

an electric clutch assembly adapted to facilitate the selective coupling of said first pulley with said central drive shaft, when said electric clutch assembly is energized; and a second compressor-driving pulley directly coupled to said central drive shaft to facilitate the rotational driving of said compressor from a second power source via the use of a pulley belt;

wherein:

said first and second compressor-driving pulleys are mounted on opposite ends of said central drive shaft with respect to each other;

said central drive shaft is modified to extend beyond each compressor housing end bell in order to support one of said first and second pulleys at each end of said compressor;

each of said first and second housing end bells are substantially structurally identical, each having a bearing adapted to support said central drive shaft and each having packing seals for inhibiting the leakage of either lubricants or refrigerant;

at one end of said compressor, said electric clutch assembly is equipped with an outer hub at which said first compressor-driving pulley is adapted to be selectively coupled to said central drive shaft; and at the other end of said compressor, said second compressor-driving pulley is directly coupled to said compressor's drive shaft via the neck of respective housing end bell, onto which is installed an additional roller bearing.

2. The compressor of claim 1, wherein:

said first compressor-driving pulley is adapted to receive a pulley belt of a type selected from the group consisting of serpentine, V-belt, V-link, and flat; and said second compressor-driving pulley is adapted to receive a pulley belt of a type selected from the group consisting of serpentine, V-belt, V-link, and flat.

3. A method of making a modified air-conditioning compressor used for a motorized vehicle, said method comprising the steps of:

providing a refrigerant compressor, said refrigerant compressor having a first housing end bell, said refrigerant compressor having a second housing end bell, said refrigerant compressor having an inlet and an outlet for transporting refrigerant, and said refrigerant compressor having a central drive shaft that when turned with rotational force causes said compressor to compress refrigerant gasses contained therein;

providing a first compressor-driving pulley adapted to facilitate the rotational driving of said compressor from a first power source via the use of a pulley belt;

providing an electric clutch assembly adapted to facilitate the selective coupling of said first pulley with said central drive shaft, when said electric clutch assembly is energized;

providing a second compressor-driving pulley directly coupled to said central drive shaft to facilitate the rotational driving of said compressor from a second power source via the use of a pulley belt;

modifying said central drive shaft to extend beyond each compressor housing end bell in order to support one of said first and second pulleys at each end of said compressor;

mounting said first and second compressor-driving pulleys on opposite ends of said central drive shaft with respect to each other;

providing said first and second housing end bells that are substantially structurally identical to each other, each having a bearing adapted to support said central drive shaft and each having packing seals for inhibiting the leakage of either lubricants or refrigerant;

at one end of said compressor, equipping said electric clutch assembly with an outer hub at which said first compressor-driving pulley is adapted to be selectively coupled to said central drive shaft; and at the other end of said compressor, directly coupling said second compressor-driving pulley to said compressor's drive shaft via the neck of respective housing end bell, onto which is installed an additional roller bearing.

4. An air-conditioning system for an automobile, said automobile having an engine, said air-conditioning system comprising:

a refrigerant compressor,
said refrigerant compressor having a first housing end bell,
said refrigerant compressor having a second housing end bell,
said refrigerant compressor having an inlet and an outlet for transporting refrigerant, and
said refrigerant compressor having a central drive shaft that when turned with rotational force causes said compressor to compress refrigerant gasses contained therein;

a first compressor-driving pulley adapted to facilitate the rotational driving of said compressor via the use of a pulley belt driven by said automobile engine;

a first electric clutch assembly adapted to facilitate the selective coupling of said first pulley with said central drive shaft, when said electric clutch assembly is energized;

a second compressor-driving pulley directly coupled to said central drive shaft to facilitate the rotational driving of said compressor via a pulley belt driven by a power source that does not rely on the running of said automobile engine;

an electrical motor adapted to be able to drive said refrigerant compressor via a pulley system,
wherein said electrical motor is adapted to be powered from an independent DC power source that does not depend on the running of the engine of said automobile,
wherein the shaft of said electrical motor is adapted to drive a third pulley mounted at one end of the housing of said electrical motor, said third pulley coupled to said second compressor-driving pulley via a pulley belt, and
wherein said electrical motor is adapted to have a second electric clutch assembly to allow the selective coupling of said electrical motor's shaft and said third pulley, depending on whether said electric clutch assembly is energized;

an evaporator for transferring heat from the passenger compartment air of said automobile to said refrigerant circulated within said evaporator;

at least one electric passenger-compartment cooling fan for circulating air around said evaporator;

a condenser for transferring heat from refrigerant to the outside atmosphere;

at least one electric heat-sink fan for circulating outside air around said condenser; and an independent DC electrical system, independent of said automobile's engine electrical system, comprised of:
at least one battery for providing power to said air-conditioning system when said automobile engine is shutdown,
a solar-energy grid, said solar-energy grid adapted to be mounted at one or more surfaces and/or windows of said automobile to ensure solar exposure for producing electrical power, said solar-energy grid adapted to provide a trickle charge to said at least one battery, and
a programmable controller module, said controller module adapted to monitor the voltage level of said at least one battery, the passenger-compartment ambient temperature, and the operating status of said automobile,
wherein said programmable controller module is further adapted to start said air-conditioning system and set the power mode for said air-conditioning system, and
wherein said programmable controller module is adapted to prevent the simultaneous engagement of said first and second electric clutches.

5. The system of claim 4, wherein:
said first compressor-driving pulley is adapted to receive a pulley belt of a type selected from the group consisting of serpentine, V-belt, V-link, and flat; and
said second compressor-driving pulley is adapted to receive a pulley belt of a type selected from the group consisting of serpentine, V-belt, V-link, and flat.

6. The system of claim 4, wherein:
said first and second compressor-driving pulleys are mounted on the same end of said central drive shaft;
said electric clutch assembly is equipped with an outer hub at which said first compressor-driving pulley is adapted to be selectively coupled to said central drive shaft; and
said second compressor-driving pulley is directly coupled to said central drive shaft via the neck of said outer hub, onto which is installed an additional roller bearing.

7. The system of claim 4, wherein:
said first and second compressor-driving pulleys are mounted on opposite ends of said central drive shaft with respect to each other;
said central drive shaft is modified to extend beyond each compressor housing end bell in order to support one of said first and second pulleys at each end of said compressor;
each of said first and second housing end bells are substantially structurally identical, each having a bearing adapted to support said central drive shaft and each having packing seals for inhibiting the leakage of either lubricants or refrigerant;
at one end of said compressor, said electric clutch assembly is equipped with an outer hub at which said first compressor-driving pulley is adapted to be selectively coupled to said central drive shaft; and
at the other end of said compressor, said second compressor-driving pulley is directly coupled to said compressor's drive shaft via the neck of respective housing end bell, onto which is installed an additional roller bearing.

8. The system of claim 4, wherein said power mode set by said programmable controller module is selected from the group consisting of powered by said engine, powered by said independent DC electrical system using said battery, and recharging mode of said battery from said solar-energy grid.

9. The system of claim 4, wherein said programmable controller module comprises a computer-readable medium, said computer-readable medium containing programmed instructions that cause said independent DC electrical system to energize said second electric clutch, said electrical motor, said at least one passenger-compartment fan, and said at least one heat-sink fan to energize and activate said air-conditioning system at a pre-determined day and time, for a pre-determined interval, while said automobile engine is not running.

10. The system of claim 4, wherein said programmable controller module comprises a computer-readable medium, said computer-readable medium containing programmed instructions that cause the powering of said air-conditioning system to emanate from said independent DC electrical system while disengaging said first electric clutch when said automobile slows to a predetermined speed or less.

11. The system of claim 4, wherein said programmable controller module comprises a computer-readable medium, said computer-readable medium containing programmed instructions that cause the powering of said air-conditioning system to emanate from said independent DC electrical system while disengaging said first electric clutch when said automobile is at a standstill while said automobile engine is running and said automobile's transmission is in a park or neutral state.

12. The system of claim 9, wherein:
said programmable controller module is adapted for wireless communication in order to enable remote-control operations by a user; and
said air-conditioning system can be remotely started and stopped by a user using a remote keyless device.

13. The system of claim 4, wherein:
said programmable controller module is adapted for wireless communication in order to enable remote-control operations by a user; and
said air-conditioning system can be remotely started and stopped by a user using a mobile application on a wireless communications device.

14. A method of using an air-conditioning system for an automobile according to claim 12, said method comprising the step of:
using a remote keyless device, remotely causing said automobile's air-conditioning system to start.

15. A method of using an air-conditioning system for an automobile according to claim 12, said method comprising the step of:
using a remote keyless device, remotely causing said automobile's air-conditioning system to stop.

16. A method of using an air-conditioning system for an automobile according to claim 13, said method comprising the step of:
using a mobile application on a wireless communications device, remotely causing said automobile's air-conditioning system to start.

17. A method of using an air-conditioning system for an automobile according to claim 13, said method comprising the step of:
using a mobile application on a wireless communications device, remotely causing said automobile's air-conditioning system to stop.

18. An air-conditioning system for an automobile, comprising:
a thermal-electric cooler (TEC) module, having one or more Peltier junctions;
a thermal-energy-storage (TES) unit comprised of at least one low-pressure container containing a non-reactive filler material,
wherein the non-reactive filler material is adapted to absorb heat and melt above a predetermined threshold, and conversely is adapted to release stored heat and freeze at a predetermined threshold; and
one or more forced-air-circulation devices for circulating ambient air between the passenger compartment of an automobile, and said TEC module and TES unit;
an independent DC electrical system, independent of said automobile's engine electrical system, said independent DC electrical system comprised of:
at least one battery for providing power to said air-conditioning system when said automobile engine is shutdown,
a solar-energy grid, said solar-energy grid adapted to be mounted at one or more of the surfaces and/or windows of said automobile to ensure solar exposure for producing electrical power, said solar-energy grid adapted to provide a trickle charge to said at least one battery, and
a programmable controller module, said controller module adapted to monitor the voltage level of said at least one battery, the passenger-compartment ambient temperature, and the operating status of said automobile,
wherein said programmable controller module is further adapted to start said air-conditioning system and set the power mode for said air-conditioning system.

19. The system of claim 18, wherein said power mode set by said programmable controller module is selected from the group consisting of powered by an automobile's engine electrical system, powered by said independent DC electrical system using said battery, and recharging mode of said battery from said solar-energy grid.

20. The system of claim 18, wherein said programmable controller module comprises a computer-readable medium, said computer-readable medium containing programmed instructions that cause said independent DC electrical system to energize said one or more passenger-compartment forced-air circulation devices and activate said air-conditioning system at a pre-determined day and time, for a pre-determined interval, while said automobile engine is not running.

21. The system of claim 18, wherein said programmable controller module comprises a computer-readable medium, said computer-readable medium containing programmed instructions that cause the powering of said air-conditioning system to emanate from said independent DC electrical system instead of said automobile's engine electrical system when said automobile slows to a predetermined speed or less.

22. The system of claim 18, wherein said programmable controller module comprises a computer-readable medium, said computer-readable medium containing programmed instructions that cause the powering of said air-conditioning system to emanate from said independent DC electrical system instead of said automobile's engine electrical system when said automobile is at a standstill while said automobile engine is running and said automobile's transmission is in a park or neutral state.

23. The system of claim 18, wherein:
said programmable controller module is adapted for wireless communication in order to enable remote-control operations by a user; and
said air-conditioning system can be remotely started and stopped by a user using a remote keyless device.

24. The system of claim 18, wherein:
said programmable controller module is adapted for wireless communication in order to enable remote-control operations by a user; and
said air-conditioning system can be remotely started and stopped by a user using a mobile application on a wireless communications device.

25. A method of using an air-conditioning system for an automobile according to claim 23, said method comprising the step of:
using a remote keyless device, remotely causing said automobile's air-conditioning system to start.

26. A method of using an air-conditioning system for an automobile according to claim 23, said method comprising the step of:
   using a remote keyless device, remotely causing said automobile's air-conditioning system to stop.

27. A method of using an air-conditioning system for an automobile according to claim 24, said method comprising the step of:
   using a mobile application on a wireless communications device, remotely causing said automobile's air-conditioning system to start.

28. A method of using an air-conditioning system for an automobile according to claim 24, said method comprising the step of:
   using a mobile application on a wireless communications device, remotely causing said automobile's air-conditioning system to stop.

29. An air-conditioning system for an automobile, comprising:
   a thermal-electric cooler (TEC) module, having one or more Peltier junctions;
   a thermal-energy-storage (TES) unit comprised of at least one low-pressure container containing a non-reactive filler material,
      wherein the non-reactive filler material is adapted to absorb heat and melt above a predetermined threshold, and conversely is adapted to release stored heat and freeze at a predetermined threshold; and
   one or more forced-air-circulation devices for circulating ambient air between the passenger compartment of an automobile, and said TEC module and TES unit;
wherein said non-reactive filler material is selected from the group consisting of Silicon Nitride, Silicon Carbide, Titanium Diboride, Aluminum Oxide, and Mullite.

30. An air-conditioning system for an automobile, said automobile having an engine, said air-conditioning system comprising:
   a refrigerant compressor,
      said refrigerant compressor having a first housing end bell,
      said refrigerant compressor having a second housing end bell,
      said refrigerant compressor having an inlet and an outlet for transporting refrigerant, and
      said refrigerant compressor having a central drive shaft that when turned with rotational force causes said compressor to compress refrigerant gasses contained therein;
   a first compressor-driving pulley adapted to facilitate the rotational driving of said compressor via the use of a pulley belt driven by said automobile engine;
   a first electric clutch assembly adapted to facilitate the selective coupling of said first pulley with said central drive shaft, when said electric clutch assembly is energized;
   a second compressor-driving pulley directly coupled to said central drive shaft to facilitate the rotational driving of said compressor via a pulley belt driven by a power source that does not rely on the running of said automobile engine;
   an electrical motor adapted to be able to drive said refrigerant compressor via a pulley system,
      wherein said electrical motor is adapted to be powered from an independent DC power source that does not depend on the running of the engine of said automobile,
      wherein the shaft of said electrical motor is adapted to drive a third pulley mounted at one end of the housing of said electrical motor, said third pulley coupled to said second compressor-driving pulley via a pulley belt, and
      wherein said electrical motor is adapted to have a second electric clutch assembly to allow the selective coupling of said electrical motor's shaft and said third pulley, depending on whether said electric clutch assembly is energized;
   an evaporator for transferring heat from the passenger compartment air of said automobile to said refrigerant circulated within said evaporator;
   a condenser for transferring heat from refrigerant to the outside atmosphere;
   at least one electric heat-sink fan for circulating outside air around said condenser;
   a thermal-electric cooler (TEC) module, having one or more Peltier junctions;
   a thermal-energy-storage (TES) unit comprised of at least one low-pressure container containing a non-reactive filler material,
      wherein the non-reactive filler material is adapted to absorb heat and melt above a predetermined threshold, and conversely is adapted to release stored heat and freeze at a predetermined threshold;
   one or more forced-air-circulation devices for circulating ambient air between the passenger compartment of an automobile and said evaporator, TEC module, and TES unit; and
   an independent DC electrical system, independent of said automobile's engine electrical system, comprised of:
      at least one battery for providing power to said air-conditioning system when said automobile engine is shutdown,
      a solar-energy grid, said solar-energy grid adapted to be mounted at one or more surfaces and/or windows of said automobile to ensure solar exposure for producing electrical power, said solar-energy grid adapted to provide a trickle charge to said at least one battery, and
      a programmable controller module, said controller module adapted to monitor the voltage level of said at least one battery, the passenger-compartment ambient temperature, and the operating status of said automobile,
         wherein said programmable controller module is further adapted to start said air-conditioning system and set the power mode for said air-conditioning system,
         wherein said programmable controller module is further adapted to select the operating mode of said air-conditioning system, and
         wherein said programmable controller module is adapted to prevent the simultaneous engagement of said first and second electric clutches.

31. The system of claim 30, wherein said non-reactive filler material is selected from the group consisting of Silicon Nitride, Silicon Carbide, Titanium Diboride, Aluminum Oxide, and Mullite.

32. The system of claim 30, wherein said programmable controller module can select an air-conditioning system operating mode is selected from the group consisting of compressor-based, TEC-based, and OFF.

33. The system of claim 30, wherein:
   said first compressor-driving pulley is adapted to receive a pulley belt of a type selected from the group consisting of serpentine, V-belt, V-link, and flat; and said second compressor-driving pulley is adapted to receive a pulley belt of a type selected from the group consisting of serpentine, V-belt, V-link, and flat.

34. The system of claim 30, wherein:
said first and second compressor-driving pulleys are mounted on the same end of said central drive shaft;
said electric clutch assembly is equipped with an outer hub at which said first compressor-driving pulley is adapted to be selectively coupled to said central drive shaft;
said second compressor-driving pulley is directly coupled to said central drive shaft via the neck of said outer hub, onto which is installed an additional roller bearing.

35. The system of claim 30, wherein:
said first and second compressor-driving pulleys are mounted on opposite ends of said central drive shaft with respect to each other;
said central drive shaft is modified to extend beyond each compressor housing end bell in order to support one of said first and second pulleys at each end of said compressor;
each of said first and second housing end bells are substantially structurally identical, each having a bearing adapted to support said central drive shaft and each having packing seals for inhibiting the leakage of either lubricants or refrigerant;
at one end of said compressor, said electric clutch assembly is equipped with an outer hub at which said first compressor-driving pulley is adapted to be selectively coupled to said central drive shaft; and
at the other end of said compressor, said second compressor-driving pulley is directly coupled to said compressor's drive shaft via the neck of respective housing end bell, onto which is installed an additional roller bearing.

36. The system of claim 30, wherein said power mode set by said programmable controller module is selected from the group consisting of powered by said engine, powered by said independent DC electrical system using said battery, and recharging mode of said battery from said solar-energy grid.

37. The system of claim 30, wherein said programmable controller module comprises a computer-readable medium, said computer-readable medium containing programmed instructions that cause said independent DC electrical system to energize said second electric clutch, said electrical motor, said one or more forced-air-circulation devices, and said at least one heat-sink fan to energize and activate said air-conditioning system at a pre-determined day and time, for a pre-determined interval, while said automobile engine is not running.

38. The system of claim 30, wherein said programmable controller module comprises a computer-readable medium, said computer-readable medium containing programmed instructions that cause the powering of said air-conditioning system to emanate from said independent DC electrical system while disengaging said first electric clutch when said automobile slows to a predetermined speed or less.

39. The system of claim 30, wherein said programmable controller module comprises a computer-readable medium, said computer-readable medium containing programmed instructions that cause the powering of said air-conditioning system to emanate from said independent DC electrical system instead of said automobile's engine electrical system when said automobile slows to a predetermined speed or less.

40. The system of claim 30, wherein said programmable controller module comprises a computer-readable medium, said computer-readable medium containing programmed instructions that cause the powering of said air-conditioning system to emanate from said independent DC electrical system while disengaging said first electric clutch when said automobile is at a standstill while said automobile engine is running and said automobile's transmission is in a park or neutral state.

41. The system of claim 30, wherein said programmable controller module comprises a computer-readable medium, said computer-readable medium containing programmed instructions that cause the powering of said air-conditioning system to emanate from said independent DC electrical system instead of said automobile's engine electrical system when said automobile is at a standstill while said automobile engine is running and said automobile's transmission is in a park or neutral state.

42. The system of claim 30, wherein said programmable controller module comprises a computer-readable medium, said computer-readable medium containing programmed instructions that can cause the operating mode of said air-conditioning system to switch between a compressor-based air-conditioning mode and a TEC-based air-conditioning mode.

43. The system of claim 30, wherein said programmable controller module comprises a computer-readable medium, said computer-readable medium containing programmed instructions that can prevents the air-conditioning system to simultaneously operate in a compressor-based air-conditioning mode and a TEC-based air-conditioning mode.

44. The system of claim 30, wherein:
said programmable controller module is adapted for wireless communication in order to enable remote-control operations by a user; and
said air-conditioning system can be remotely started and stopped by a user using a remote keyless device.

45. The system of claim 30, wherein:
said programmable controller module is adapted for wireless communication in order to enable remote-control operations by a user; and
said air-conditioning system can be remotely started and stopped by a user using a mobile application on a wireless communications device.

46. A method of using an air-conditioning system for an automobile according to claim 44, said method comprising the step of:
using a remote keyless device, remotely causing said automobile's air-conditioning system to start.

47. A method of using an air-conditioning system for an automobile according to claim 44, said method comprising the step of:
using a remote keyless device, remotely causing said automobile's air-conditioning system to stop.

48. A method of using an air-conditioning system for an automobile according to claim 45, said method comprising the step of:
using a mobile application on a wireless communications device, remotely causing said automobile's air-conditioning system to start.

49. A method of using an air-conditioning system for an automobile according to claim 45, said method comprising the step of:
using a mobile application on a wireless communications device, remotely causing said automobile's air-conditioning system to stop.

50. A method of using an air-conditioning system for an automobile according to claim 42, said method comprising the step of:
using a remote keyless device, remotely causing said automobile's air-conditioning system to start, wherein the compressor-based subsystem of the air-conditioning system initially starts, as run via said DC motor powered from said independent DC electrical system, and runs until a predetermined passenger-compartment temperature is reached, and wherein after said predetermined temperature is reached, said compressor-based subsystem is disengaged and de-energized, and said TEC-based subsystem is energized to maintain said passenger-compartment temperature within a predetermined range.

51. A method of using an air-conditioning system for an automobile according to claim 42, said method comprising the step of:

using a mobile application on a wireless communications device, remotely causing said automobile's air-conditioning system to start, wherein the compressor-based subsystem of the air-conditioning system initially starts, as run via said DC motor powered from said independent DC electrical system, and runs until a predetermined passenger-compartment temperature is reached, and wherein after said predetermined temperature is reached, said compressor-based subsystem is disengaged and de-energized, and said TEC-based subsystem is energized to maintain said passenger-compartment temperature within a predetermined range.

* * * * *